United States Patent
Roblek et al.

(10) Patent No.: US 12,314,850 B2
(45) Date of Patent: May 27, 2025

(54) AUDIO PROCESSING WITH NEURAL NETWORKS

(71) Applicant: Google LLC, Mountain View, CA (US)

(72) Inventors: Dominik Roblek, Meilen (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 599 days.

(21) Appl. No.: 17/306,934

(22) Filed: May 3, 2021

(65) Prior Publication Data

US 2021/0256379 A1    Aug. 19, 2021

Related U.S. Application Data

(63) Continuation of application No. 15/151,374, filed on May 10, 2016, now Pat. No. 11,003,987.

(51) Int. Cl.
  *G06N 3/08*    (2023.01)
  *G06F 3/16*    (2006.01)
  *G06N 3/049*   (2023.01)
  *G06N 3/084*   (2023.01)
  *G10L 25/30*   (2013.01)

(52) U.S. Cl.
  CPC ............ *G06N 3/08* (2013.01); *G06F 3/16* (2013.01); *G06N 3/049* (2013.01); *G06N 3/084* (2013.01); *G10L 25/30* (2013.01)

(58) Field of Classification Search
  CPC .......... G10L 25/30; G06N 3/08; G06N 3/084
  See application file for complete search history.

(56) References Cited

U.S. PATENT DOCUMENTS

| | | | | |
|---|---|---|---|---|
| 5,608,408 A | * | 3/1997 | Caratori | G01S 13/0218 342/22 |
| 9,064,498 B2 | * | 6/2015 | Uhle | G10L 21/0208 |
| 9,190,053 B2 | | 11/2015 | Penn et al. | |
| 2009/0112584 A1 | * | 4/2009 | Li | G10L 21/0208 704/E15.001 |

(Continued)

OTHER PUBLICATIONS

'A Deep Neural Network Approach To Speech Bandwidth Expansion' Li, 2015 IEEE 978-1-4673-6997 (Year: 2015).*

(Continued)

*Primary Examiner* — Hal Schnee
(74) *Attorney, Agent, or Firm* — Honigman LLP; Brett A. Krueger; Grant Griffith (57) ABSTRACT

Methods, systems, and apparatus, including computer programs encoded on computer storage media, for audio processing using neural networks. One of the systems includes multiple neural network layers, wherein the neural network system is configured to receive time domain features of an audio sample and to process the time domain features to generate a neural network output for the audio sample, the plurality of neural network layers comprising: a frequency-transform (F-T) layer that is configured to apply a transformation defined by a set of F-T layer parameters that transforms a window of time domain features into frequency (Continued)

domain features; and one or more other neural network layers having respective layer parameters, wherein the one or more neural network layers are configured to process frequency domain features to generate a neural network output.

18 Claims, 3 Drawing Sheets

(56) References Cited

U.S. PATENT DOCUMENTS

| | | |
|---|---|---|
| 2012/0183187 A1 | 7/2012 | Sasaki et al. |
| 2014/0019390 A1 | 1/2014 | Glennon et al. |
| 2015/0032449 A1 | 1/2015 | Sainath et al. |
| 2015/0081287 A1* | 3/2015 | Elfenbein ............ G10L 21/0208 704/226 |
| 2015/0161995 A1 | 6/2015 | Sainath et al. |
| 2015/0255062 A1 | 9/2015 | Penn et al. |
| 2016/0018544 A1 | 1/2016 | Eick et al. |
| 2016/0070673 A1 | 3/2016 | Wang et al. |
| 2016/0078863 A1 | 3/2016 | Chung et al. |
| 2016/0098987 A1 | 4/2016 | Stolcke et al. |
| 2017/0132496 A1* | 5/2017 | Shoaib .................. G06N 3/045 |

OTHER PUBLICATIONS

'A Deep Neural Network for Time-Domain Signal Reconstruction': Wang, 2015, IEEE, 978-1-4673-6997 (Year: 2015).*
'Elements or artificial neural networks': Mehrotra.
'A Deep Neural Network for Time-Domai n Signal Reconstruction': Wang, 978-1-4673-6997-8.
'A Deep Neural Network Approach To Speech Bandwidth Expansion': Li, 2015, IEEE, 978-1-4673-6997.
International Preliminary Report on Patentability issued in International Application No. PCT/US2017/031888, mailed on Jul. 18, 2018, 22 pages.
Written Opinion issued in International Application No. PCT/US2017/031888, mailed on Apr. 9, 2018, 8 pages.
International Search Report and Written Opinion issued in International Application No. PCT/US2017/031888, mailed on Sep. 21, 2017, 23 pages.
Bhargava et al. "Architectures for deep neural network based acoustic models defined over windowed speech waveforms," Proc. Interspeech 2015, Sep. 6, 2015, 5 pages.
Invitation to Pay Additional Fees and, Where Applicable, Protest Fee with Partial Search Report, issued in International Application No. PCT/US2017/031888, mailed on Jul. 31, 2017, 19 pages.
Tuske et al. "Acoustic Modeling with Deep Neural Networks Using Raw Time Signal for LVCSR," Proc. Interspeech 2014, Sep. 14, 2014, 5 pages.
Velik "Discrete Fourier Transform Computation Using Neural Networks," International Conference on Computational Intelligence and Security, Dec. 13, 2008, 4 pages.
Li et al. "Automatic Instrument Recognition in Polyphonic Music Using Convolutional Neural Networks" arXiv: 1511.05520v1 [cs.SD] Nov. 2015 5 pages.
Sak et al. "Long Short-Term Memory Based Recurrent Neural Network Architectures for Large Vocabulary Speech Recognition" arXiv:1402.1128v1 [cs.NE] Feb. 2014 5 pages.

* cited by examiner

AUDIO PROCESSING WITH NEURAL NETWORKS

BACKGROUND

This U.S. patent application is a continuation of, and claims priority under 35 U.S.C. § 120 from, U.S. patent application Ser. No. 15/151,374, filed on May 10, 2016. The disclosure of this prior application is considered part of the disclosure of this application and is hereby incorporated by reference in its entirety.

BACKGROUND

This specification relates to processing inputs through the layers of a neural

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for training a neural network that includes a plurality of neural network layers on training data, wherein the neural network is configured to receive time domain features of an audio sample and to process the time domain features to generate a neural network output from the audio sample, wherein the neural network comprises (i) a frequency-transform (F-T) layer that is configured to apply a transformation defined by a set of F-T layer parameters that transforms a window of time domain features into frequency domain features and (ii) one or more other neural network layers having respective layer parameters and are configured to process the frequency domain features to generate the neural network output, and wherein the method includes the actions of obtaining training data comprising, for each of a plurality of training audio samples, time domain features of the training audio sample and a known output for the training audio sample; and training the neural network on the training data to adjust the values of the parameters of the other neural network layers and to adjust the values of the F-T layer parameters to define an optimal transformation from time-domain features to frequency-domain features.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the transformation defined by the set of F-T layer parameters that transforms a window of time domain features into frequency domain features is represented by a discrete Fourier transform (DFT) matrix.

In some cases the set of F-T layer parameters comprise a transformation matrix, wherein entries of each row of the transformation matrix comprise a respective sampled basis function.

In some implementations a first parameter for each row determines a frequency of each of the entries in the row and a second parameter for each row determines an amplitude of each of the entries in the row.

In some cases the number of rows in the transformation matrix equal the number of frequencies that are extracted.

In some implementations the set of F-T layer parameters comprise a transformation matrix, wherein the transformation matrix comprises a windowing function.

In some cases the neural network is configured to apply a windowing function to an F-T layer input.

In some aspects the training data comprises a plurality of multi-channel training data.

In some implementations the neural network comprises multiple F-T layers that are each configured to apply a transformation defined by a respective set of F-T layer parameters that transforms a window of time domain features into frequency domain features, and training the neural network comprises concatenating frequency domain features generated by each of the multiple F-T layers to perform a multi-timescale DFT.

In some cases the multiple F-T layers are each configured to apply a transformation defined by a shared set of F-T layer parameters.

In some implementations the method further comprises merging the plurality of multi-channel training data to a single training data input.

In some cases training the neural network on the training data comprises, for each window of time domain features and for the F-T layer: receiving a back-propagated gradient for the window of time domain features from a neural network layer above the F-T layer; computing the gradient of an error function for the neural network, wherein the error function is dependent on a product of the F-T layer parameters and the received back-propagated gradient; and updating the F-T layer parameters using the computed gradient.

In some implementations the window of time domain features in which the frequency-transform (F-T) layer operates is dependent on the number of received time domain features.

In some cases the F-T layer is a fully connected neural network layer.

In some implementations the neural network is configured to receive time domain features of an audio sample and to process the time domain features to generate a neural network output that classifies the audio sample and the training data comprises, for each of a plurality of training audio samples, time domain features of the training audio sample and a known classification of the training audio sample.

The subject matter described in this specification can be implemented in particular embodiments so as to realize one or more of the following advantages.

Audio processing tasks such as speech recognition, content identification, music recognition, emergency siren detection and other classification problems typically work with frequency domain features as input. Commonly used algorithms to convert time domain features to frequency domain features produce fixed-scale frequency domain features, such as linear scale frequency domain features or other pre-defined scale frequency domain features, which may be provided as input to an audio classification system, e.g., a neural network system.

However, important information may be lost during the fixed-scale conversion process and providing fixed-scale frequency domain features as input to an audio classification system may reduce the accuracy and performance of the audio classification system. Furthermore, a hardcoded fixed-scale conversion of time domain features to frequency domain features may not provide an optimal mapping from time domain to frequency domain for a particular task. For example, for some recognition tasks a linear scale frequency mapping may be optimal, for other recognition tasks a logarithmic scale or major musical scale may be optimal. As another example, some recognition tasks benefit from having a more detailed frequency scale in the mid-frequency spectrum and less detail in low and high frequency spectrum.

An adaptive time to frequency domain conversion neural network system as described in this specification learns an optimal mapping between time domain features and frequency domain features for a given recognition task. In particular, the adaptive time to frequency domain conversion neural network system learns different frequency mappings for different recognition tasks and different input signal characteristics. A neural network system implementing adaptive time to frequency domain conversion as described in this specification may therefore achieve higher levels of accuracy when classifying raw input samples compared to systems that apply a fixed-scale frequency mapping to time domain features and provide the fixed-scale frequency domain features to a neural network for processing.

Furthermore, an adaptive time to frequency domain conversion neural network system as described in this specification may learn an optimal mapping between time domain features and frequency domain features using techniques based on discrete Fourier transforms (DFT), which in some cases leads to an improvement in performance and efficiency of the neural network system compared to other neural network systems that do not implement adaptive time to frequency domain conversion, since, although the computational complexity of a DFT may actually be higher than that of other conversion techniques such as a fast Fourier transform (FFT), it can often be faster in practice because of the efficiency of matrix multiplication and the large constant associated with FFT. In addition, an adaptive time to frequency domain conversion neural network system as described in this specification maps to k frequencies where k is significantly less than n. Therefore the system performs n*k operations, which is even more efficient.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system and method for learning an optimal mapping between time domain input samples and frequency domain output samples for a given classification or regression task.

Figure 1:
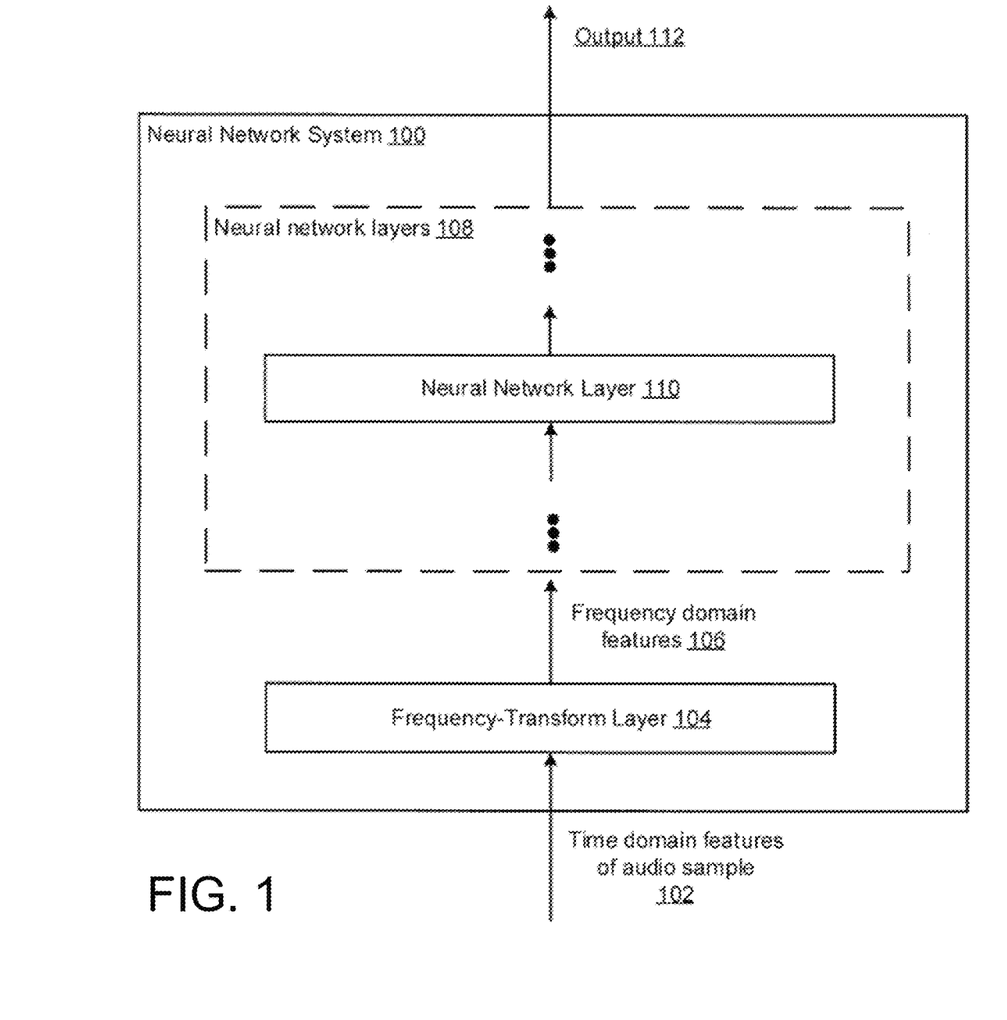
FIG. 1 is an example of an adaptive time to frequency domain conversion neural network system.

FIG. 1 shows an example an adaptive time to frequency domain conversion neural network system 100. The adaptive time to frequency domain conversion neural network system 100 is an example of a system implemented as computer programs on one or more computers in one or more locations, in which the systems, components, and techniques described below can be implemented.

The adaptive time to frequency domain conversion neural network system 100 is a machine learning system that receives system inputs and generates system outputs from the system inputs. The neural network system 100 can be configured to receive time domain features of an audio sample 102 and to generate a respective output 112 based on the input.

In some implementations the respective output may include a respective score or audio sample classification. For example, if the input to the neural network system 100 is a window of time domain features of an audio sample representing an utterance, the output generated by the neural network system 100 may be a score for each of a set of pieces of text, each score representing an estimated likelihood that the piece of text is the correct transcript for the utterance or sequence of utterances. In some examples, the neural network system 100 can be part of a content identification system and the output generated by the neural network system 100 may be a score for each of a set piece of content or each segment in each set piece of content. As another example, the neural network system 100 can be part of an emergency siren detection system and the output generated by the neural network system 100 may be a score that classifies an input as a siren or not.

In other implementations the respective output may be used to predict a single value or multiple values (e.g., regression). For example, the neural network system output 112 may estimate the level of a certain type of noise, e.g., speech, in an audio sample input to the system. As another example, the neural network system output 112 may include a prediction of a year in which a song represented by the audio sample was recorded. As a further example, the neural network system may be used to generate audio, e.g., in the case of echo cancellation. For example, the audio sample input 102 may include two sub inputs, e.g., a mixed signal and a background signal, and the respective neural network system output 112 may include an audio sample that is generated by subtracting a background signal from a mixed signal.

The adaptive time to frequency domain conversion neural network system 100 includes multiple neural network layers, e.g., a frequency transform (F-T) layer 104 and neural network layers 108. Each of the neural network layers in the adaptive time to frequency domain conversion neural network system 100 is configured to receive a respective layer input and process the layer input to generate a respective layer output from the input. The neural network layers collectively process neural network inputs received by the neural network system 100 to generate a respective neural network output for each received neural network input. Generating an adaptive time to frequency domain conversion neural network system output from an input is described in more detail below with reference to FIG. 2.

Some or all of the layers of the neural network system 100 are associated with a respective set of parameters. The neural network layers generate outputs from inputs in accordance with the current values of the parameters for the neural network layer. For example, some layers may multiply the received input by a respective parameter matrix of current parameter values as part of generating an output from the received input.

At least one of the neural network layers in the adaptive time to frequency conversion neural network system 100 is an F-T layer, e.g., F-T layer 104. An F-T layer is a neural network layer that transforms a received window of time domain features 102 to frequency domain features 106. For example, if the received window of time domain features includes L time domain features, the F-T layer can transform the window of time domain features into any number of frequency domain features. The number of frequency domain features is may depend on the computational cost and size of output from the layer. In some cases the number of frequency domain features may be less than the number of time domain features. The number of frequency domain features, e.g., the number of nodes in the F-T layer, may be the same as the number of time domain features in the window of time domain features, or may differ to the number of time domain features in the window of time domain features. The number of time domain features in the window of time domain features may be selected to determine the time window of time domain features on which the F-T layer operates. For example, a 50 ms time window with 8 KHz mono input would take 400 time domain features as input.

An F-T layer transforms a received window of time domain features to frequency domain features by applying a transformation defined by a respective set of F-T layer parameters. In some implementations a windowing function may be applied to an input signal to the F-T layer to avoid leakage, e.g., hanning windows. A transformation defined by a respective set of F-T layer parameters may be represented as a transformation matrix. The F-T layer may apply the transformation matrix to a vector representation of the window of time domain features using matrix multiplication to generate the frequency domain features. In some implementations the entries of each row of a respective transformation matrix includes a respective sampled basis function, e.g., a sampled sine wave as with a discrete Fourier transform (DFT) or a sampled cosine wave as with a discrete cosine transform (DCT). The entries of the transformation matrix may be controlled by multiple learnable parameters. For example, a first parameter for each row of the transformation matrix may determine a frequency of each of the entries in the row and a second parameter for each row of the transformation matrix may determine an amplitude of each of the entries in the row. In some implementations the number of rows in the transformation matrix equal the number of frequencies that are extracted by the F-T layer. In some cases a windowing function may be incorporated into a transformation matrix defined by a respective set of F-T layer parameters by pointwise multiplication of the windowing function with each row in the transformation matrix.

The coefficients in the frequency transform matrix may include complex numbers, e.g., computed using a standard DFT formula. As a result, the frequency transform layer may output complex numbers. In such cases the system may take the magnitude/norm or log of the magnitude to generate a real number layer output which can be fed to the rest of the network. In some implementations the F-T layer may include two matrices that are computed by decomposing the DFT into cosine (real) and sine (imaginary) parts. The two matrices may be kept separate or may be combined using a magnitude of each complex weight. In some cases the F-T layer may apply a discrete cosine transformation that takes real numbers as input and generates real numbers as output.

In some implementations the transformation defined by the respective set of F-T layer parameters includes a DFT, e.g., the transformation defined by the respective set of F-T layer parameters is represented by a DFT matrix. Although only one F-T layer 104 is depicted in FIG. 1 for convenience, the adaptive time to frequency domain conversion neural network system 100 may include multiple F-T layers. For example, multiple F-T layers may be used over different time windows and concatenated to perform a multi-scale DFT. In some implementations multiple F-T layers may apply a respective transformation defined by a shared set of F-T layer parameters.

An F-T layer, e.g., F-T layer 104, may be a fully connected neural network layer. In some implementations an F-T layer, e.g., F-T layer 104 may not include a bias or activation, e.g., as with linear activation functions.

The adaptive time to frequency domain conversion neural network system 100 includes one or more other neural network layers 108, e.g., neural network layer 110. Although only one neural network layer 110 is depicted in FIG. 1 for convenience, the neural network system 100 may include multiple neural network layers. The number of neural network layers 108 included in the neural network system 100 is dependent on the task that the neural network system 100 is configured to perform. Furthermore, the type of the neural network layers 108 included in the neural network system 100 is dependent on the task that the neural network system is configured to perform. For example, for speech recognition tasks, the neural network system 100 may include multiple neural network layers 108 including multiple Long Short-Term Memory (LSTM) neural network layers. Using LSTM neural network layers in speech recognition tasks is described in more detail in "*Long Short-Term Memory Based Recurrent Neural Network Architectures for Large Vocabulary Speech Recognition*" Haşim Sak, Andrew Senior, Françoise Beaufays, http://arxiv.org/abs/1402.1128. As another example, for musical instrument recognition tasks, the neural network system 100 may include multiple neural network layers 108 including multiple convolutional neural network layers. Applying convolutional neural networks for musical instrument recognition tasks is described in more detail in "*Automatic Instrument Recognition in Polyphonic Music Using Convolutional Neural Networks*" Peter Li, Jiyuan Qian, Tian Wang, http://arxiv.org/abs/1511.05520.

In some implementations the neural network system 100 may include one or more recurrent neural network (RNN) layers, e.g., LSTM neural network layers. In these implementations, the neural network system 100 may receive as input a sequence of windows of time domain features of an audio sample corresponding to a set of time steps. For example, the neural network system 100 may receive an audio sample that has been split into a sequence of multiple frames of data corresponding to a set of time steps, e.g., where each frame is associated with 10 milliseconds of the audio sample and includes time domain features for the frame. The F-T layer may process each input in the received sequence of time domain features and transform each input to a corresponding output of frequency domain features.

The adaptive time to frequency domain conversion neural network system 100 can be trained on multiple training audio samples in order to determine trained values of the parameters of the neural network layers, i.e., to adjust the values of the parameters from initial values to trained values. For example, during the training, the adaptive time to frequency domain conversion neural network system 100 can process features of each of multiple training audio samples and generate a respective neural network output for each training audio sample. The neural network outputs can then be used to adjust the values of the parameters of the adaptive time to frequency domain conversion neural network system 100, e.g., to adjust a transformation defined by a respective set of F-T layer parameters and to adjust the values of the parameters for the neural network layers 110. In some implementations the adaptive time to frequency domain conversion neural network system 100 adjusts the values of the parameters using gradient descent and back-propagation neural network training techniques. Training an adaptive time to frequency domain conversion neural network system 100 is described in more detail below with reference to FIG. 3.

Once the adaptive time to frequency domain conversion neural network system 100 has been trained, the neural network system may receive a new neural network input for processing and process the neural network input through the neural network layers to generate a new neural network output for the input in accordance with the trained values of the parameters of the adaptive time to frequency domain conversion neural network system 100.

Figure 2:
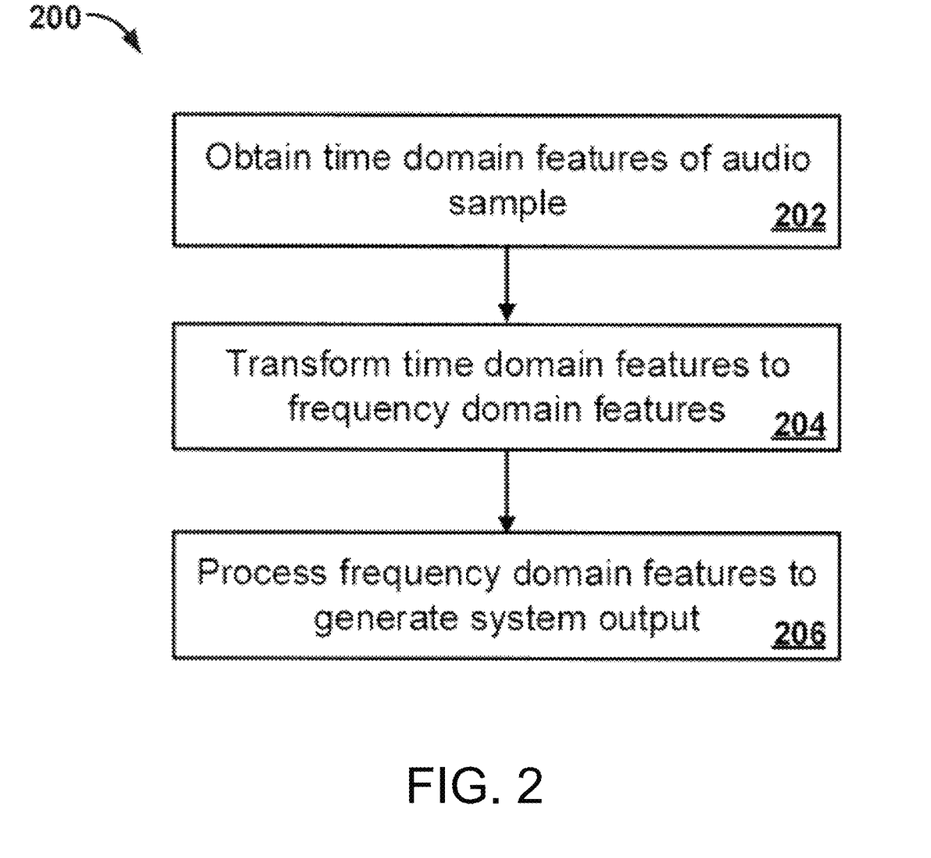
FIG. 2 is a flow diagram of an example process for generating an adaptive time to frequency domain conversion neural network system output from an input.

FIG. 2 is a flow diagram of an example process 200 for generating an adaptive time to frequency domain conversion neural network system output from an input. For convenience, the process 200 will be described as being performed by a system of one or more computers located in one or more locations. For example, a neural network system that includes a frequency transform layer, e.g., the adaptive time to frequency domain conversion neural network system 100 with frequency transform layer 104 of FIG. 1, appropriately programmed in accordance with this specification, can perform the process 200.

The system obtains input time domain features of an audio sample (step 202). The input time domain features of the audio sample may include one or more windows of time domain features, e.g., arranged in a sequence. In some implementations the input time domain features include time domain features from a single channel. In other implementations the input time domain features include time domain features from multiple channels. In such cases, the system may merge the input time domain features from the multiple channels into a single channel input.

The system transforms a window of time domain features of the audio sample into frequency domain features (step 204). For example, the system may process the window of time domain features using one or more F-T layers, e.g., F-T layer 104 of FIG. 1, to generate the respective frequency domain features. As described above with reference to FIG. 1, an F-T layer may transform a window of time domain features of an audio sample into frequency domain features by applying a transformation defined by a respective set of F-T layer parameters to the window of time domain features. For example, the transformation defined by the respective set of F-T layer parameters may be represented by a transformation matrix, where applying the transformation to the window of time domain features includes multiplying the transformation matrix with a vector representation of the window of time domain features using matrix multiplication. Example transformation matrices are described in more detail above with reference to FIG. 1.

The system processes the frequency domain features to generate a neural network output (step 206). For example, the system may process the frequency domain features using one or more other neural network layers, e.g., neural network layers 108 of FIG. 1, to generate the neural network output. The generated neural network output may include a classification of the audio sample described above with reference to step 202. For example, if the audio sample represents an utterance, or sequence of utterances, the generated neural network output may include a score for each of a set of pieces of text, each score representing an estimated likelihood that the piece of text is the correct transcript for the utterance or sequence of utterances. In some cases the generated neural network output may be used to predict a single value or multiple values (e.g., regression).

As described above, in some implementations a window of time domain features may include time domain features from multiple channels and the system may process the multi-channel window of time domain features using multiple F-T layers to generate multiple numbers of respective frequency domain features. In such a case, the system may concatenate the generated multiple numbers of respective frequency domain features into a single channel input and process the single channel input using one or more neural network layers to generate a neural network output.

The system can perform the process 200 as part of processing a neural network input through the neural network system layers to generate a neural network output for the neural network input. The process 200 can be performed for a neural network input for which the desired output, i.e., the neural network output that should be generated by the system for the input, is not known. The system can also perform the process 200 on inputs in a set of training samples, i.e., a set of inputs for which the output that should be predicted by the system is known, in order to train the system, i.e., to determine trained values for the parameters of the F-T neural network layers and the other neural network layers. In particular, the process 200 can be performed repeatedly on inputs selected from a set of training samples as part of a machine learning training technique to train the neural network, e.g., a stochastic gradient descent back-propagation training technique. An example training process for an adaptive time to frequency conversion neural network system is described in more detail below with reference to FIG. 3.

Figure 3:
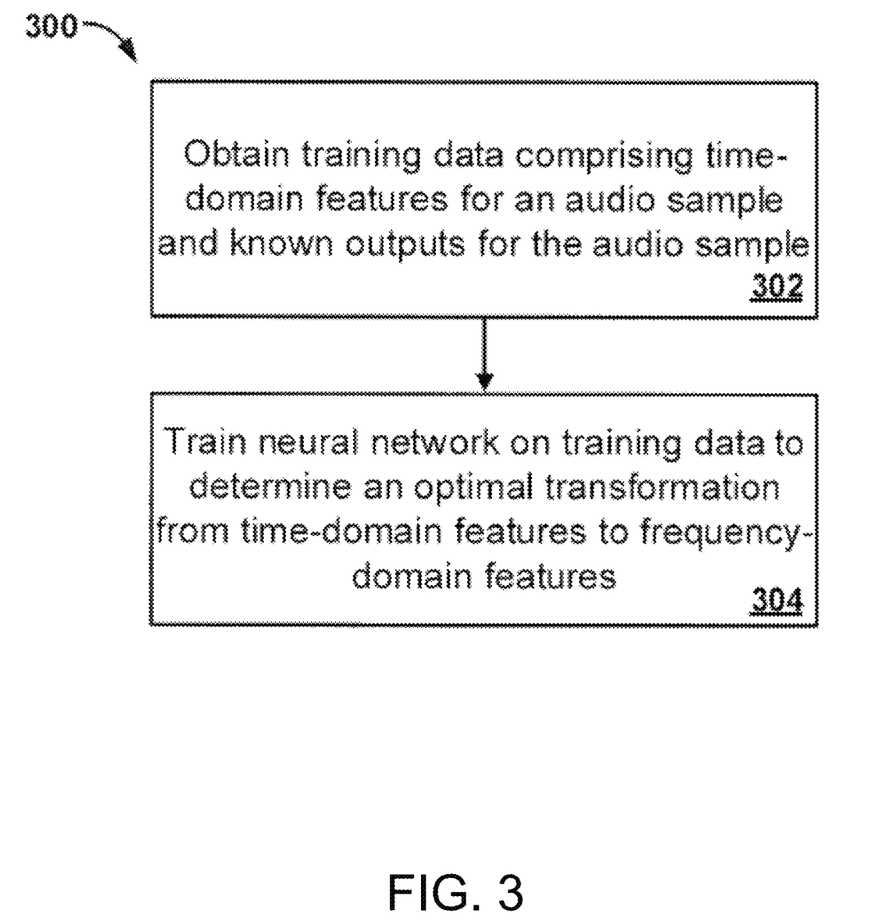
FIG. 3 is a flow diagram of an example process for training a frequency transformation neural network layer and one or more other neural network layers.

FIG. 3 is a flow diagram of an example process 300 for training a frequency transformation neural network layer and one or more other neural network layers. For convenience, the process 300 will be described as being performed by a system of one or more computers located in one or more locations. For example, a neural network system, e.g., the adaptive time to frequency domain conversion neural network system 100 of FIG. 1, appropriately programmed in accordance with this specification, can perform the process 300.

The system obtains training data including, for each of a set of training audio samples, time domain features of the training audio sample and a known output for the training audio sample (step 302). In some implementations the training data may include time domain features of a training audio sample and a known classification for the training audio sample. The time domain features of the training audio sample may include one or more windows of time domain features. The length of a window of time domain features may be dependent on the size of the respective training audio sample and a number of time domain features of the respective training audio sample. For example, an 8 KHz single channel training audio sample with 400 time domain features may include a plurality of windows of time domain features of length 50 ms. In some cases there may be a step between windows of time domain features, e.g., 25 ms, so that there may be a half overlap between each window.

In some implementations the training data may include a single channel training data input, e.g., monophonic sound. In other implementations the training data input may include a plurality of multi-channel training data, e.g., stereophonic sound.

The system trains the neural network on the training data to adjust the values of the parameters of the other neural network layers and to adjust the values of the F-T layer parameters to determine a set of trained parameters (step 304). For example, as described above with reference to FIG. 1, in some implementations the F-T layer parameters may be represented as a transformation matrix where the entries of each row of the transformation matrix includes a respective sampled basis function, e.g., a sampled sine wave or cosine wave, specified by a first parameter that determines a frequency of each of the entries in the row and a second parameter that determines an amplitude of each of the entries in the row. In such implementations, training the neural network on training data may include adjusting the values of the first and second parameters to determine trained values of the first and second parameters for each row of the transformation matrix.

The system trains the neural network by processing the training data as input to the neural network to generate a training data neural network output, as described above with reference to FIG. 2. For example, the system processes the training data input using one or more F-T layers, e.g., F-T layer 104 of FIG. 1, to generate a training data output for the one or more F-T layers. Once the training data output for the one or more F-T layers has been generated, the system can provide the training data output for the one or more F-T layers as training data input to a neural network layer above the one or more F-T layers for further processing.

As described above with reference to step 304, in some implementations the system obtains training data that includes a plurality of multi-channel training data. In some cases the system may merge the multi-channel training data into a single training data input and train the neural network on the single training data input. Alternatively, in other cases the neural network may include multiple F-T layers that are each configured to apply a transformation defined by a shared or respective set of F-T layer parameters that transforms a window of time domain features into frequency domain features, as described above with reference to FIG. 1. The system may then train the neural network by concatenating frequency domain features generated by each of the multiple F-T layers to perform a multi-timescale DFT.

In some implementations training the neural network system on the training data includes, for each window of time domain features and for the F-T layer, receiving a back-propagated gradient for the window of time domain features from a neural network layer above the F-T layer. For example, the back-propagated gradient may be generated by computing the gradient for a top layer in the neural network and then backpropagating the computed gradient through the neural network layers using back-propagation techniques.

Training the neural network system on the training data may also include, for each window of time domain features and for the F-T layer, computing the gradient of an error function for the neural network with respect to current values of the F-T layer parameters and updating the F-T layer parameters using the computed gradient. For example, the system may update the values of a vector that fully specifies the F-T layer parameters using machine learning training techniques, e.g., by summing the gradient and the vector or by multiplying the gradient by a learning rate and then adding the product to the vector. In some implementations, during training the underlying parameters of a F-T matrix associated with the F-T layer are modified, so that during back propagation the underlying frequency and amplitude parameters are adjusted. The matrix weights are then updated based on the new frequency/amplitude parameters.

The set of trained F-T layer parameters define an optimal transformation from time-domain features to frequency-domain features. The determined optimal transformation from time-domain features to frequency-domain features is dependent on the task to be performed by the adaptive time to frequency domain conversion neural network system, as specified by the training data described above with reference to step 302. For example, a determined optimal transformation from time-domain features to frequency-domain features for a speaker identification task may differ to a determined optimal transformation from time-domain features to frequency-domain features for a speech recognition task. Similarly, the determined optimal transformation from time-domain features to frequency-domain features is dependent on input signal characteristics. For example, a determined optimal transformation from time-domain features to frequency-domain features for an input audio sample from a particular microphone type may differ to that of a determined optimal transformation from time-domain features to frequency-domain features for the same audio sample from a different microphone type.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method executed on data processing hardware that causes the data processing hardware to perform operations comprising:
   receiving, as input to a trained frequency-transform (F-T) layer of a neural network, time domain features of an input audio sample, the input audio sample comprising a speech signal representing an utterance and a background signal;
   applying, by the trained F-T layer, a transformation defined by a set of trained F-T layer parameters that transforms the time domain features of the input audio sample into frequency domain features, the trained F-T layer trained to learn a mapping between time domain features and frequency features for a particular audio processing task;
   processing, using a plurality of convolutional layers of the neural network, the frequency domain features that were transformed by the transformation applied by the trained F-T layer;
   generating, as output from the neural network, based on the processed frequency domain features, an output audio sample by subtracting the background signal from the speech signal of the input audio sample; and
   training the neural network on training data comprising, for each of a plurality of training audio samples, corresponding time domain features of the training audio sample and a corresponding known output for the training audio sample, wherein training the neural network comprises updating tunable parameters of the trained F-T layer.

2. The computer-implemented method of claim 1, wherein:
   applying the transformation comprises applying the transformation defined by the set of trained F-T layer parameters to transform a window of the time domain features of the input audio sample into the frequency domain features; and
   the window of the time domain features is dependent on a number of received time domain features.

3. The computer-implemented method of claim 2, wherein the transformation defined by the set of trained F-T layer parameters that transforms the window of time domain features of the input audio sample into the frequency domain features is represented by a discrete Fourier transform (DFT) matrix.

4. The computer-implemented method of claim 1, wherein:
   the set of trained F-T layer parameters comprise a transformation matrix; and
   entries of each row of the transformation matrix comprise a respective sampled basis function.

5. The computer-implemented method of claim 4, wherein a first parameter for each row determines a frequency of each of the entries in the row and a second parameter for each row determines an amplitude of each of the entries in the row.

6. The computer-implemented method of claim 1, wherein:
   the set of trained F-T layer parameters comprise a transformation matrix; and
   the transformation matrix comprises a windowing function.

7. The computer-implemented method of claim 1, wherein the trained F-T layer comprises a fully connected neural network layer.

8. The computer-implemented method of claim 1, wherein training the neural network on the training data comprises, for each window of time domain features and for the trained F-T layer:
   receiving a back-propagated gradient for the window of time domain features from a neural network layer above the trained F-T layer;
   computing the gradient of an error function for the neural network, wherein the error function is dependent on a product of the trained F-T layer parameters and the received back-propagated gradient; and
   updating the trained F-T layer parameters using the computed gradient.

9. The computer-implemented method of claim 1, wherein:
   the neural network comprises multiple trained F-T layers that are each configured to apply a transformation defined by a respective set of trained F-T layer parameters that transforms a window of time domain features into frequency domain features; and
   training the neural network comprises concatenating frequency domain features generated by each of the multiple trained F-T layers to perform a multi-timescale DFT.

10. A system comprising:
    data processing hardware; and
    memory hardware in communication with the data processing hardware and storing instructions that, when executed on the data processing hardware, causes the data processing hardware to perform operations comprising:
    receiving, as input to a trained frequency-transform (F-T) layer of a neural network, time domain features of an input audio sample, the input audio sample comprising a speech signal representing an utterance and a background signal;
    applying, by the trained F-T layer, a transformation defined by a set of trained F-T layer parameters that transforms the time domain features of the input audio sample into frequency domain features, the trained F-T layer trained to learn a mapping between time domain features and frequency features for a particular audio processing task;
    processing, using a plurality of convolutional layers of the neural network, the frequency domain features that were transformed by the transformation applied by the trained F-T layer;

generating, as output from the neural network, based on the processed frequency domain features, an output audio sample by subtracting the background signal from the speech signal of the input audio sample; and training the neural network on training data comprising, for each of a plurality of training audio samples, corresponding time domain features of the training audio sample and a corresponding known output for the training audio sample, wherein training the neural network comprises updating tunable parameters of the trained F-T layer.

11. The system of claim 10, wherein:

applying the transformation comprises applying the transformation defined by the set of trained F-T layer parameters to transform a window of the time domain features of the input audio sample into the frequency domain features; and the window of the time domain features is dependent on a number of received time domain features.

12. The system of claim 11, wherein the transformation defined by the set of trained F-T layer parameters that transforms the window of time domain features of the input audio sample into the frequency domain features is represented by a discrete Fourier transform (DFT) matrix.

13. The system of claim 10, wherein:

the set of trained F-T layer parameters comprise a transformation matrix; and entries of each row of the transformation matrix comprise a respective sampled basis function.

14. The system of claim 13, wherein a first parameter for each row determines a frequency of each of the entries in the row and a second parameter for each row determines an amplitude of each of the entries in the row.

15. The system of claim 10, wherein:

the set of trained F-T layer parameters comprise a transformation matrix; and the transformation matrix comprises a windowing function.

16. The system of claim 10, wherein the trained F-T layer comprises a fully connected neural network layer.

17. The system of claim 10, wherein training the neural network on the training data comprises, for each window of time domain features and for the trained F-T layer:

receiving a back-propagated gradient for the window of time domain features from a neural network layer above the trained F-T layer;

computing the gradient of an error function for the neural network, wherein the error function is dependent on a product of the trained F-T layer parameters and the received back-propagated gradient; and updating the trained F-T layer parameters using the computed gradient.

18. The system of claim 10, wherein:

the neural network comprises multiple trained F-T layers that are each configured to apply a transformation defined by a respective set of trained F-T layer parameters that transforms a window of time domain features into frequency domain features; and training the neural network comprises concatenating frequency domain features generated by each of the multiple trained F-T layers to perform a multi-timescale DFT.

* * * * *